US009076213B2

(12) United States Patent
Jin et al.

(10) Patent No.: US 9,076,213 B2
(45) Date of Patent: Jul. 7, 2015

(54) LIGHT ESTIMATION FROM VIDEO (71) Applicant: Adobe Systems Incorporated, San Jose, CA (US)

(72) Inventors: Halin Jin, Campbell, CA (US); Hyeongwoo Kim, Gyeonggi (KR); Sunil Hadap, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 210 days.

(21) Appl. No.: 13/863,739

(22) Filed: Apr. 16, 2013

(65) Prior Publication Data

US 2014/0307951 A1 Oct. 16, 2014

(51) Int. Cl.
G06T 7/00 (2006.01)

(52) U.S. Cl.
CPC ............ G06T 7/0055 (2013.01); G06T 7/0042 (2013.01)

(58) Field of Classification Search
None
See application file for complete search history.

(56) References Cited

U.S. PATENT DOCUMENTS

| 5,028,138 | A  | * | 7/1991  | Wolff          | 356/369 |
| 5,854,632 | A  | * | 12/1998 | Steiner        | 345/426 |
| 7,123,257 | B2 | * | 10/2006 | Sawada         | 345/420 |
| 7,948,622 | B2 | * | 5/2011  | Kanamori et al.| 356/364 |
| 2002/0152478 | A1 | * | 10/2002 | Stauder et al. | 725/143 |
| 2006/0244719 | A1 | * | 11/2006 | Brigham et al. | 345/156 |
| 2007/0046686 | A1 | * | 3/2007  | Keller         | 345/581 |
| 2007/0222781 | A1 | * | 9/2007  | Kondo et al.   | 345/426 |
| 2010/0214406 | A1 | * | 8/2010  | Potapenko      | 348/135 |
| 2011/0234590 | A1 | * | 9/2011  | Jones et al.   | 345/426 |
| 2013/0201325 | A1 | * | 8/2013  | Kessler et al. | 348/135 |

OTHER PUBLICATIONS

Hara et al. "Light Source Position and Reflectance Estimation from a Single View without the Distant Illumination Assumption," 2005.*
Johnson et al. "Exposing Digital Forgeries Through Specular Highlights on the Eye" 2007.*

* cited by examiner

*Primary Examiner* — Barry Drennan
*Assistant Examiner* — Alexander J Lesnick
(74) *Attorney, Agent, or Firm* — Kilpatrick Townsend & Stockton LLP (57) ABSTRACT

Embodiments of the invention include a method and/or system for determining the relative location of light sources in a video clip. The relative location of a light source can be determined from information found within the video clip. This can be determined from specular reflection on a planar surface within the video clip. An ellipse can be fit to glare that is indicative of specular reflection on the planar surface. An outgoing light angle can be determined from the ellipse. From this outgoing light angle, the incident light angle can be determined for the frame. From this incident light angle, the location of the light source can be determined.

18 Claims, 5 Drawing Sheets

LIGHT ESTIMATION FROM VIDEO

FIELD

This disclosure relates generally to computer vision.

BACKGROUND

Light estimation from video is an interesting problem in many computer vision, computer graphics and robotics applications. For instance, in order to insert a virtual object into a video scene (a problem known as match moving or motion tracking in cinematography) and render it properly, the position of lights illuminating the scene should be known. Often light probes can be positioned at points within the video scene to measure the incident illumination conditions at each point within the scene. But using light probes can be time-consuming because such use requires physically placing a light probe at each point of interest within the scene and recording the illumination conditions at that point of interest. This is not possible for every situation. Light probes also require access to the scene. Such access may be challenging at a later date since the scene may have changed, the lights may have been moved, or the scene may have been destroyed.

SUMMARY

Embodiments of the invention include a method and/or system for receiving a video clip having a scene and receiving an indication specifying a planar surface within a frame of interest of the scene. This planar surface, for example, can include a visual representation of a specular reflection. The outgoing angle can be determined from the representation of the specular reflection and an incoming incident angle of light can be determined from the normal of the planar surface within the frame of interest and the outgoing angle.

In some embodiments, an equation specifying the relationship of the planar surface within the scene can be received or determined. This equation can be received from, and/or determined using, a 3D reconstruction of the scene. In some embodiments, an ellipse can be fit to the visual representation of the specular reflection and the outgoing light direction can be determined using the ellipse.

In some embodiments, a second frame can be identified having the planar surface within the frame. The second frame can include a second representation of a specular reflection. A second outgoing angle can be determined from the second representation of the specular reflection and a second incoming incident angle of light can be determined from the normal of the planar surface and the second outgoing angle. The location of a nearby light source can be determined based on the second incoming angle and incoming incident angle of light.

In some embodiments, an indication can be received that specifies a frame of interest within the video clip that includes the planar region. A plurality of frames can also be selected that are chronologically located before and/or after the frame of interest. This plurality of frames can include the frame of interest. The maximum specular information frame can be determined with a planar region having the maximum specular information compared with other planar regions within the plurality of frames. The outgoing direction of light can then be determined from the planar region within the maximum specular information frame.

These illustrative embodiments are mentioned not to limit or define the disclosure, but to provide examples to aid understanding thereof.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed to determine the location of near and far light sources illuminating a scene in a video clip. This can be useful in cinematographic match moving (or motion tracking) where video artists insert computer graphics into live-action footage with correct position, scale, orientation, and motion relative to the photographed objects into a video clip. These computer graphics are typically inserted after the live action footage has been recorded with a normal camera using software-based technology. In order to apply the proper lighting effects on the computer aided graphics, the location and/or position of light sources in a scene must first be mapped. This is typically done using light probes placed at each point of interest within the scene and recording the incident illumination conditions at that point in the scene. The light probe information collected at the scene can then be used to specify the position of the various light sources illuminating the scene. Then computer aided graphics can be added to the scene having illumination that is consistent with the scene illumination. The use of light probes, however, is time intensive and requires foresight into whether the computer graphics will be added to a scene.

Some embodiments of the invention can identify the location of near and/or far light sources within a video clip without the use of light probes or other conventional techniques. Moreover, some embodiments of the invention can also be used to identify the location of near and/or far light sources within a video clip using information received from a user and information derived from the video clip. For instance, the location of light sources can be extrapolated from information found in the video clip and some user input. For example, in some embodiments, a user can specify a planar region within a frame of interest where specular reflection of light occurs. This planar region, for example, may also be found within a number of possibly contiguous frames located chronologically before and/or after the frame of interest. From the specular reflection pattern found on at least one of the planar regions in the frames, embodiments of the invention can determine the location of near and far light sources based on how light interacts with the planar regions.

Some embodiments of the invention can use specular reflection information within a frame or frames to determine the location of various light sources illuminating a scene. A scene is a collection of frames within a video clip sharing common visual features. Specular reflection is the reflection of light in which light from a single incoming direction is reflected into a single outgoing direction. Mirrors, for instance, are nearly perfect specular reflectors. A flat, glossy surface may also be a good specular reflector. Specular reflection follows the law of reflection, which states that the direction of incoming light and the direction of the reflected outgoing light make the same angle with respect to the surface normal. Thus, the angle of incidence equals the angle of reflection, and the incident, normal, and reflected directions are coplanar. In contrast, diffuse reflection reflects light from a single incoming direction into a number of different directions.

Embodiments of the invention can use the specular reflection information on a surface within one or more frames within a video clip to determine the location of light sources within a scene. For instance, specular reflection on a surface located within a frame of interest can be identified either automatically or with user input. The specular reflection may be represented on the surface within the frame as an ellipse. The center of such an ellipse can be determined using any number of fitting techniques. The normal of the surface can also be determined. The normal can be found from 3D reconstruction data that represents the various objects captured within the video frame. The outgoing angle of light can be determined based on the location of the camera and the center of the ellipse. By knowing the outgoing angle of light and the normal of the surface, the incoming angle of light can be determined.

Embodiments of the invention can also pick a frame from a scene that includes the most specular information. Or the planar region within a scene having the most specular information. Using this frame, embodiments of the invention can provide the best fit to the ellipse. A number of techniques can be used to determine which frame has the most specular information.

Moreover, embodiments of the invention can be used to determine the location of both near and far light sources. Light sources that are located far away from the scene can be assumed to be located at infinity and the direction of the outgoing angle of light can be sufficient to determine the location of the light sources. Light sources that are nearby are not assumed to be at infinity. Two incoming angles can be determined from two different frames using embodiments of the invention. From these two incoming angles the location of the light source is triangulated.

Figure 1A:
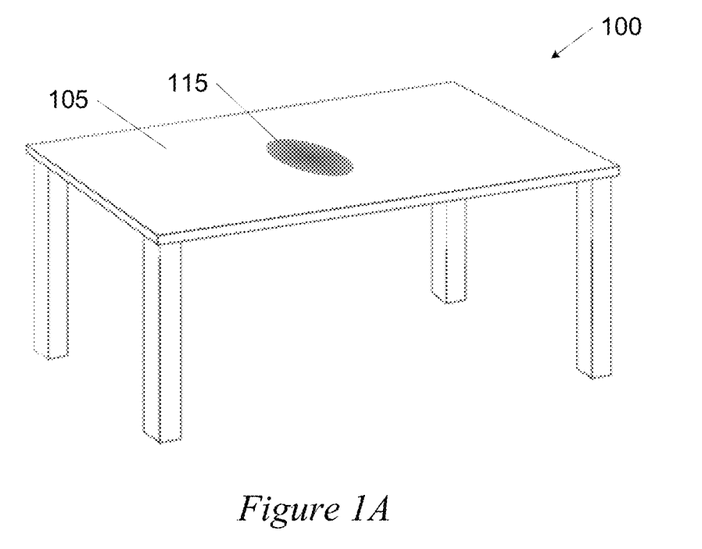
FIG. 1A and FIG. 1B show examples of a frame including a planar surface having a specular reflection thereon according to some embodiments of the invention.

For example, a scene can include table 100 as shown in FIG. 1A. Table 100 can be captured in a number of frames forming a scene. In the scene, table top 105 includes specular reflection 115. Table top 105 (which is a planar region) can be defined as a polygon using 3D reconstruction data.

Figure 1B:
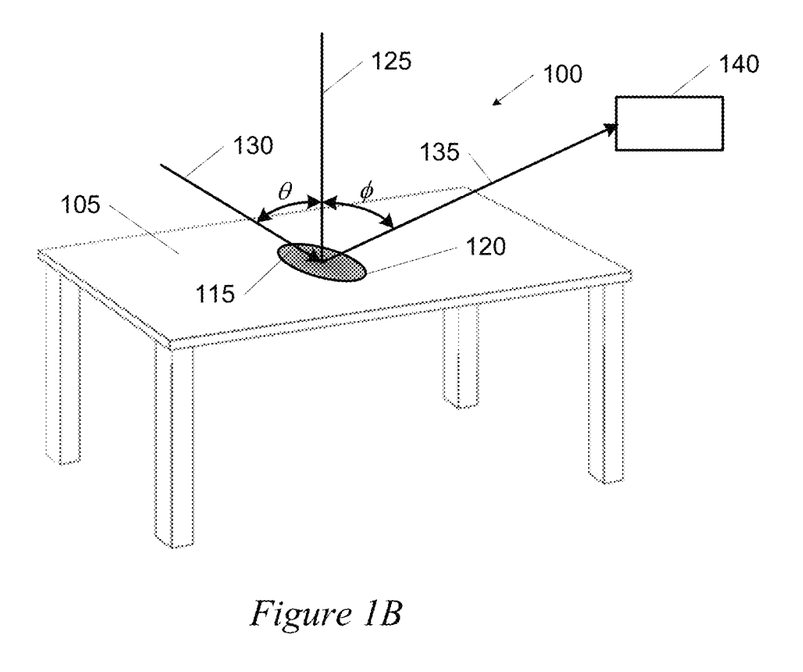

In FIG. 1B normal 125 is the normal to table top 105 and can be centered within ellipse 120. The outgoing light angle, $\phi$, between outgoing light direction 135 and normal 125 is the same angle as the incoming light angle, $\theta$, between incident light direction 130 and normal 125. Once normal 125 and outgoing light direction 135 are known, the angle of incident light 130 can easily be determined.

Normal 125 can be calculated from 3D reconstruction data of the scene and can be placed at the center of ellipse 120. The center of ellipse can be calculated based on the geometry or light intensity using any standard fitting algorithm(s) known in the art. For example, the center of ellipse can be determined based on fitting line of ellipse 120 to specular reflection 115. Once fitted, the geometric center of ellipse 120 can be determined. As another example, the center of ellipse 120 and/or specular reflection 115 can be chosen based on the luminance of the ellipse. The pixel within the ellipse having the average highest luminance value can be selected as the center.

The outgoing light angle, $\phi$, between outgoing light direction 135 and normal 125 can also be determined from 3D reconstruction data, which can include the location of the camera relative to the scene. Once normal 125 is known based on the center of ellipse 120, a line extending between the location of camera 140 and where normal 125 meets table top 105 can be determined using the 3D reconstruction data. This line can define outgoing light angle, $\phi$. The incident light angle, $\theta$, is also known since the two angles are the same within the plane formed by normal 125, outgoing light direction 135, and incoming light direction 130. Once this angle is known the angle of incidence of the light source can be determined relative to normal 125.

Figure 2:
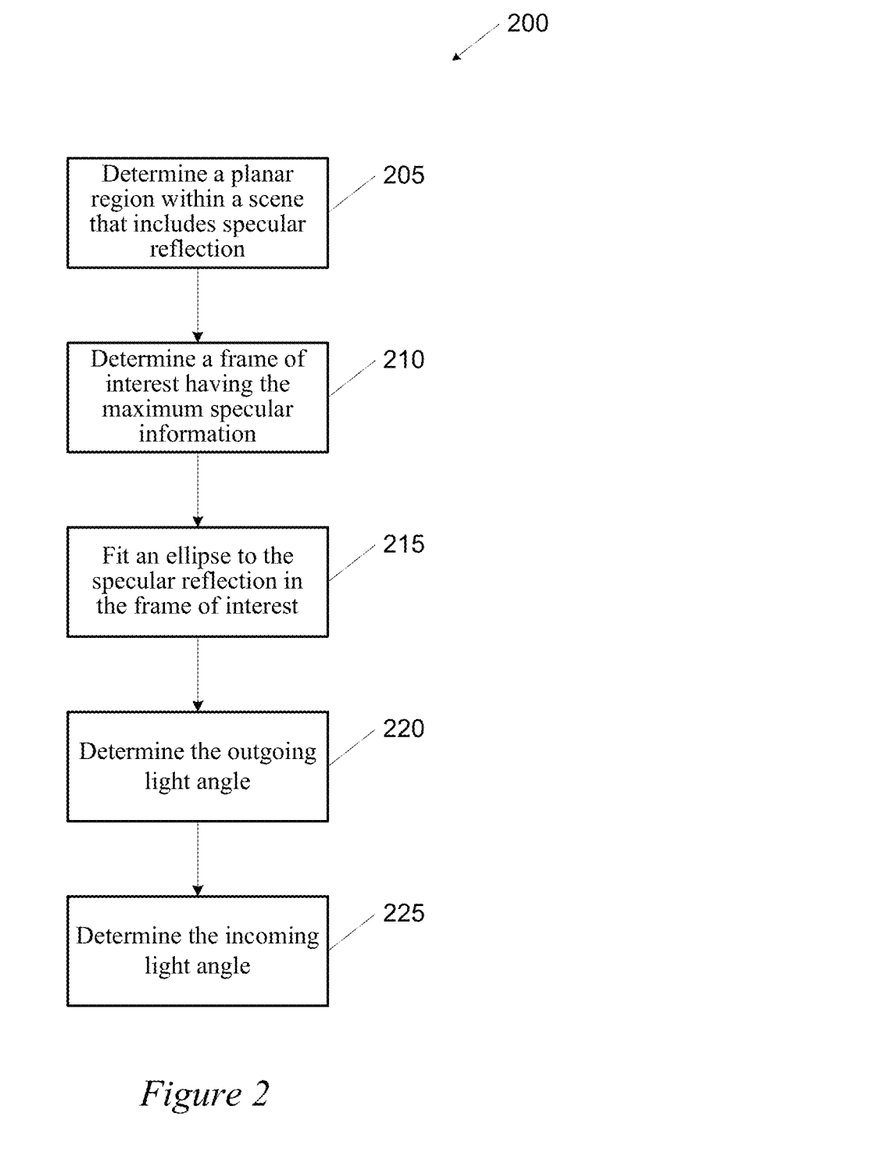
FIG. 2 is a flowchart of a process for determining incident light direction for distant light from a digital video clip according to some embodiments of the invention.

FIG. 2 shows process 200 for determining the outgoing angle of light in a digital video scene comprising a plurality of frames according to some embodiments of the invention. The digital video can include a plurality of frames where each frame is represented digitally as a matrix of pixel values. Typically, each frame is defined as a mix of red, green and blue colors. Each pixel, therefore, can be represented as a linear combination of red, green, and blue values. These different values are often called channels such as the red channel, the blue channel, and the green channel. The video clip can be analyzed by a user through a video editing application executing on a computer system. The application can receive various inputs and/or commands from the user through user interfaces coupled with the computer system that indicates preferences and/or selections from the user. This application can also include functions, algorithms and/or subroutines that can execute all or portions of processes 200, 300 and/or 400 as described in more detail below.

Process 200 starts at block 205, where a planar region that includes specular reflection is identified within a scene. This planar region can be identified by a user through a user interface or by an algorithm executed by a processor. Regardless, some surface within a frame of interest within a scene that includes specular reflection is identified.

At block 210, a frame of interest having the greatest specular information can be determined from a subset of frames within the scene. In some embodiments, the frame of interest can be selected based on the specular information within the planar region. The amount of specular information within the frame or within the boundaries of the planar region can be determined, for example, by performing a subspace analysis as described in more detail below.

At block 215, an ellipse can be fitted to the specular reflection within the frame of interest using any ellipse fitting technique. From the fitting of the ellipse, the center of the ellipse can be determined. At block 220, the outgoing light angle ($\phi$ in FIG. 1) between the camera location and the center of the ellipse can be determined. In some embodiments, 3D reconstruction data of the scene can be used to determine the location of the camera relative to the surface. From this, the outgoing light angle can be determined.

Figure 3:
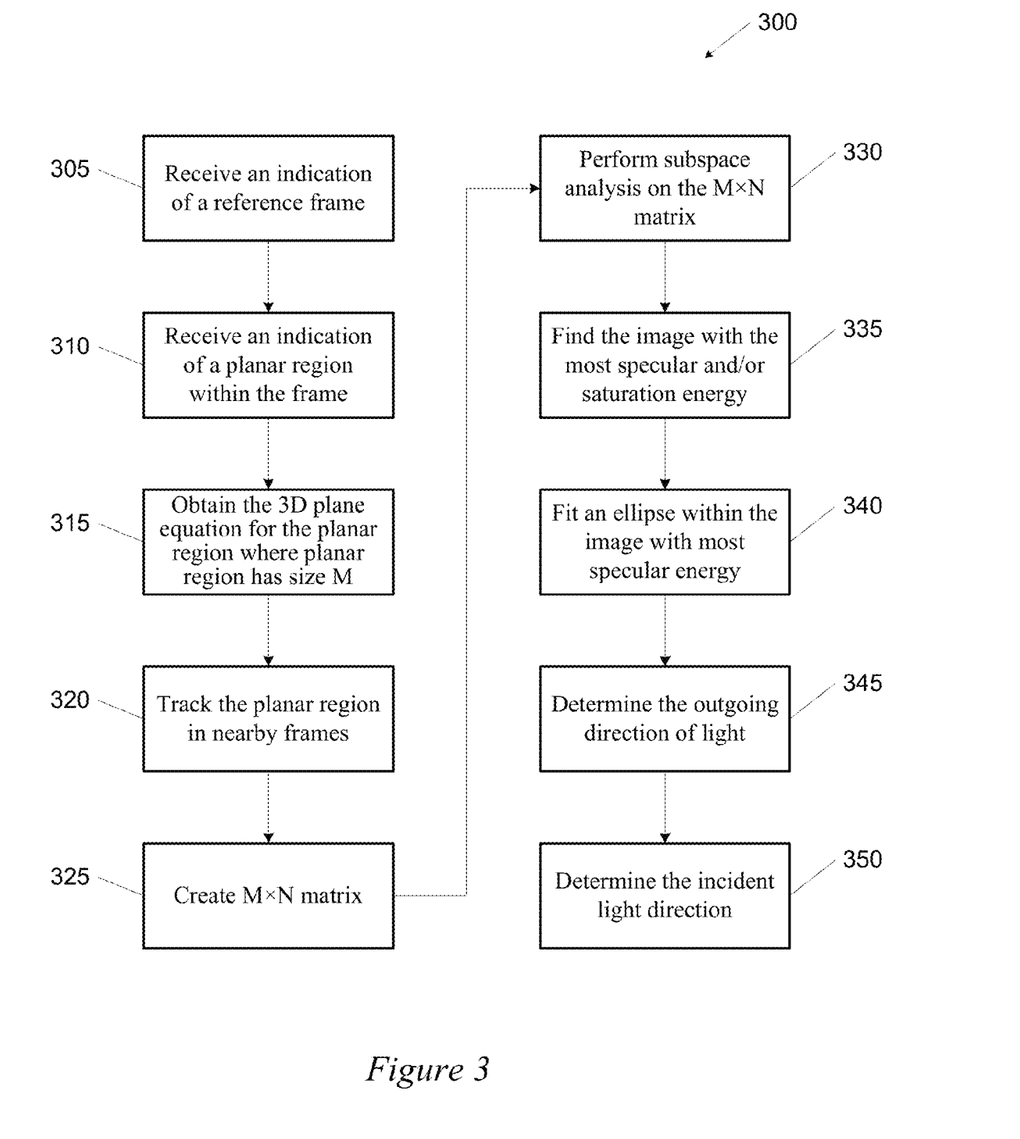
FIG. 3 is a flowchart of a process for determining incident light direction for distant light from a digital video clip according to some embodiments of the invention.
Figure 4:
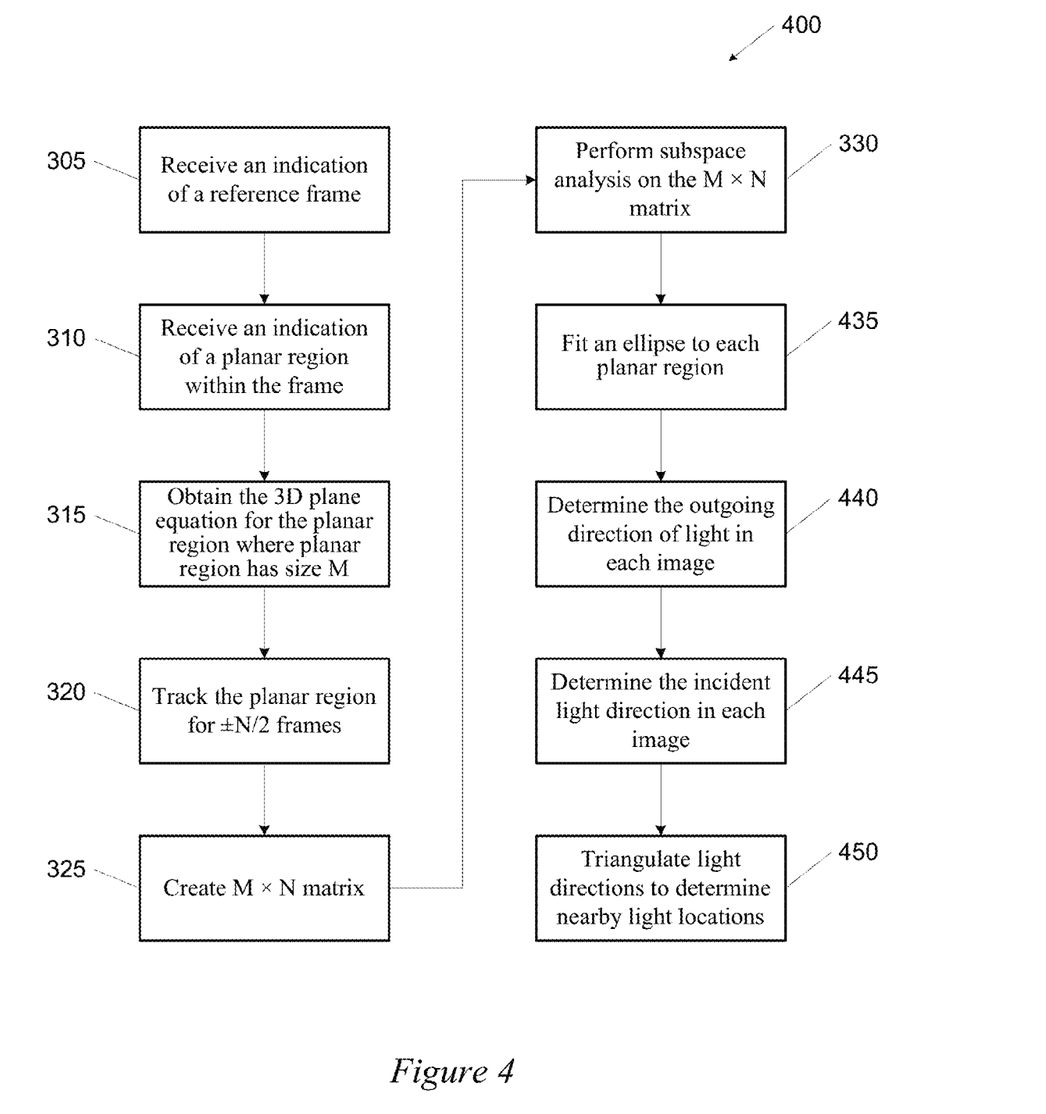
FIG. 4 is a flowchart of a process for determining incident light direction for nearby light from a digital video clip according to some embodiments of the invention.

At block 225, the incoming light angle ($\theta$ in FIG. 1) between the center of the ellipse and the light source can be determined. This can be determined using the normal of the surface (e.g., as determined from the 3D reconstruction data) and the outgoing light angle relative to the normal. For specular reflection the incoming light angle and the outgoing light angle relative to the normal is the same angle. The incoming light angle can then be used to determine the position of the light source. Different techniques can be used depending on whether the light source is a distant light source or a proximate light source. FIGS. 3 and 4 describe different embodiments of processes for determining the position of a light source based on a representation of specular reflection on a planar surface within a scene.

FIG. 3 is a flowchart of a process 300 for determining incident light direction for distant light from a video clip according to some embodiments of the invention. Process 300 can start at block 305, where an indication of a frame of interest can be received. This indication, for example, can be received from a user through the user interface. The indication can specify one of the many frames that make up the video clip (or a scene in the video clip). The frame can be specified through a graphical user interface and/or by a frame number.

At block 310, an indication of a planar region within the frame of interest can also be received. This indication, for example, can be received from a user through the user interface. In some embodiments, the indication can include an indication of a polygonal shape or dimensions defining a planar region within the frame of interest. For example, the user using an input device such as a mouse can draw a rectangle (or other polygonal shape) within the frame of interest. This rectangle can define the planar region. The vertices of this rectangle can then be returned and received by process 300. As another example, the user can indicate a pixel or a group of pixels within the frame of interest and a polygonal planar region surrounding this pixel can be defined. This planar region of interest can include M pixels.

In some embodiments, both the frame of interest and the planar surface can be indicated in a single action by the user. For example, an input can indicate both the frame and the location of the planar surface based on a single user interaction. That is, while interacting with the video clip, the user can indicate a planar surface within the frame of interest. By so indicating the planar surface, the user has also indicated the frame of interest of the video clip.

For example, the scene can include a visual representation object such as table 100, as shown in FIG. 1A. The object can include a planar surface such as table top 105 that includes specular reflection 115. At block 305, an indication can be received specifying a frame of interest that includes the planar surface of the object. At block 310, an indication can be received specifying table top 105 as the planar region. In some situations, only a portion of a surface may be selected based on user input and/or because portions of the table top are obscured.

In some embodiments, a computer algorithm can identify the specular reflection on the planar surface within the video clip. In such embodiments, the indication of the planar region received at block 310 can be received from the computer algorithm. For example, a frame of interest can be indicated (by a user or an algorithm) and the planar region or regions can be identified using a 3D scene equation or any other algorithm. In such embodiments, block 310 may be skipped.

At block 315, a 3D equation can be obtained that defines the planar region within the frame of interest. Any number of 3D reconstruction routines, functions, algorithms, applications, etc. can be used to generate the 3D reconstruction data. The 3D reconstruction data, for example, can provide a numerical representation of the objects or indices of the objects found within the scene. The 3D reconstruction data, can include a set of three dimensional vectors in Cartesian coordinate space (e.g., x, y, and z coordinates), that represent geometric points in each frame. In some embodiments, the 3D reconstruction data can be generated by a third party process and stored in memory. This data can then be read from memory at block 315 and used in process 300.

In other embodiments, the 3D reconstruction can be performed on all or parts of the video clip when the 3D reconstruction data is needed; for example, as part of block 315. In this way, the needed 3D reconstruction data of specific frames or scenes is generated.

Using the 3D reconstruction data, an equation can be determined that specifies the planar region. This can be done, for example, using a robust estimator such as RANSAC to estimate the coefficient of the plane equation. Any other estimation technique can be used such as, for example, the Hough transform. In some embodiments, the 3D equation can specify the normal of the planar surface or the normal can be derived from the 3D equation.

In the example shown in FIG. 1A, the 3D reconstruction can provide an equation mathematically defining table top 105 or a portion of table top 105.

At block 320 the planar region can be tracked in frames near the frame of interest. These frames can be contiguous. Using multiple frames can be beneficial. For example, the frame with the greatest specular reflectivity can be identified and used, which can result in better estimates of the outgoing light angle. In some embodiments, the planar region can be tracked in the five frames before and the five frames after the frame of interest. The 3D equation can be used to track the planar region in these frames. The total number of frames being tracked, in this example, is 11 (that is N=11). Any number of frames can be tracked; for example, 15, 21, 25, 31, 35, 41, etc. frames can be tracked. Moreover, these frames can be found on one or both sides of the frame of interest.

At block 325, a matrix can be created having dimension M that represents the number of pixels in each planar region in each of the N frames. For example, each planar region can be converted into an M-dimensional vector, $x_i$, where i is an index value from 1 to N. That is, the two-dimensional matrix representing the pixel values of the frame can be converted into a single vector where the product of the dimensions of the two-dimensional matrix can equal M. Each of these N vectors can be combined to create an M×N matrix.

For example, suppose there are five frames of interest that include the planar region. In this case, N equals five. Also suppose that each frame (or subset of the frame such as the planar region) is represented by a 200×100 matrix of pixel values. In this case, M equals 20,000. Each of the five images can then be vectorized into a vector of 20,000 (200×100). A matrix can then be created with dimensions of 20,000×5.

It is assumed that each image, $x_i$, can be conformed to the following model:

$$x_i = D + S_i + O_i + N_i,$$

where D is the diffuse component and is assumed to be the same for all images. $S_i$ is the specular component, $O_i$ is the saturation, and $N_i$ is the noise for the $i^{th}$ image. The specular component, saturation and noise are all assumed to change with each image. Hence, each of these components includes the index, i, while the diffuse component does not. It can be further assumed that the specular component, $S_i$, exists in a low-dimension subspace with dimension r. From these assumptions, at block 330, a subspace analysis, (e.g., a robust principal component analysis (RPCA)) can be performed to compute D, $S_i$, $O_i$, and N.

At block 335, the planar region, $x_j$, with the most specular information can be identified. The combination of the specular and noise components, $S_j+N_j$, of the $j^{th}$ planar region, for example, can be used to identify the planar region (or frame) having the most specular information. This frame can be labeled as the $j^{th}$ planar region. In some embodiments, the planar region with the most energy in $S_i$ and $N_i$ can be picked as having the most specular information. At block 340, an ellipse can be fitted to the specular reflection within the planar region that has the most specular information.

The direction of the outgoing light can be determined from the center of the ellipse to the location of the camera. The center of the ellipse can be found in a number of ways. For example, an ellipse can be fit to the center of the specular reflection using any number of fitting or optimization algorithms such as, for example, least squares fitting, Gaussian fitting, robust cost function optimization, elliptical regression, etc. The physical center of the ellipse can then be determined based on the geometry of the ellipse and the fit. As another example, the center of the ellipse can be found by finding the center of the intensity distribution across the ellipse. The normal can be positioned at this centered portion and incoming and outgoing angles can be measured relative to the normal.

At block 345 the outgoing light direction and the normal to the planar region can be used to calculate the incident angle of the light. Because the light being analyzed is specular, the angle of reflection relative to the normal of the planar surface is the same as the incident angle within a vertical plane.

Process 300 can be repeated a number of times to determine the incident angle of any number of light sources. Moreover, process 300 can also be repeated multiple times to determine the incident angle of the same light source. Furthermore, process 300 can be repeated multiple times on the same specular reflection to produce multiple angles of incident light, and the average angle can then be used.

FIG. 4 is a flowchart of process 400 for determining incident light direction of nearby light sources using a digital video clip according to some embodiments of the invention. Process 400 includes blocks 305, 310, 315, 320, 325, and 330 that are the same as those shown in process 300. After block 330, process 400 moves to block 435. At block 435, an ellipse is fit to each planar region within each of the N frames. Distant light sources can be considered to be infinitely far away because their angle of incident does not change as the camera moves through a scene. Hence only the angle relative to the planar region is needed to determine the position of distant lights. The angle of incidence of nearby lights, however, changes as the camera moves through the scene. Their position can be determined using angels calculated at one or more frames.

In some embodiments, an ellipse is fit to the planar regions of a subset of the N frames. The ellipse is fit to these planar regions as noted above in regard to block 340 of process 300.

At block 440, the outgoing direction of light is determined for each frame based on each ellipse. This can occur for each ellipse in a manner similar to what is described above in regard to block 345 of process 300. In this situation, the outgoing direction of light is determined for each ellipse that was created in block 435 or a subset of the ellipses created in block 435. For each frame, the incident angle of the light can be calculated for each ellipse from the outgoing light angle and the normal, to the planar surface. This calculation can be similar to what is described above in regard to block 350.

At block 450, the location of nearby lights can be determined by triangulating the two or more incident angles. Triangulation can determine the location of one or more nearby lights based on the incident angle found in one frame and the incident angle found in another frame. Triangulation uses the distance between the ellipses (e.g., the center of the ellipses based on geometry or luminous intensity as noted above) as the ellipses move from frame to frame, and the angles calculated in block 445 determine the location of the light source.

In some embodiments, the location of multiple nearby light sources can be discovered. Any triangulation technique may be used.

Embodiments of the invention can operate on video clips of any type or format. Moreover, embodiments of the invention can operate on video clips of any length.

Figure 5:
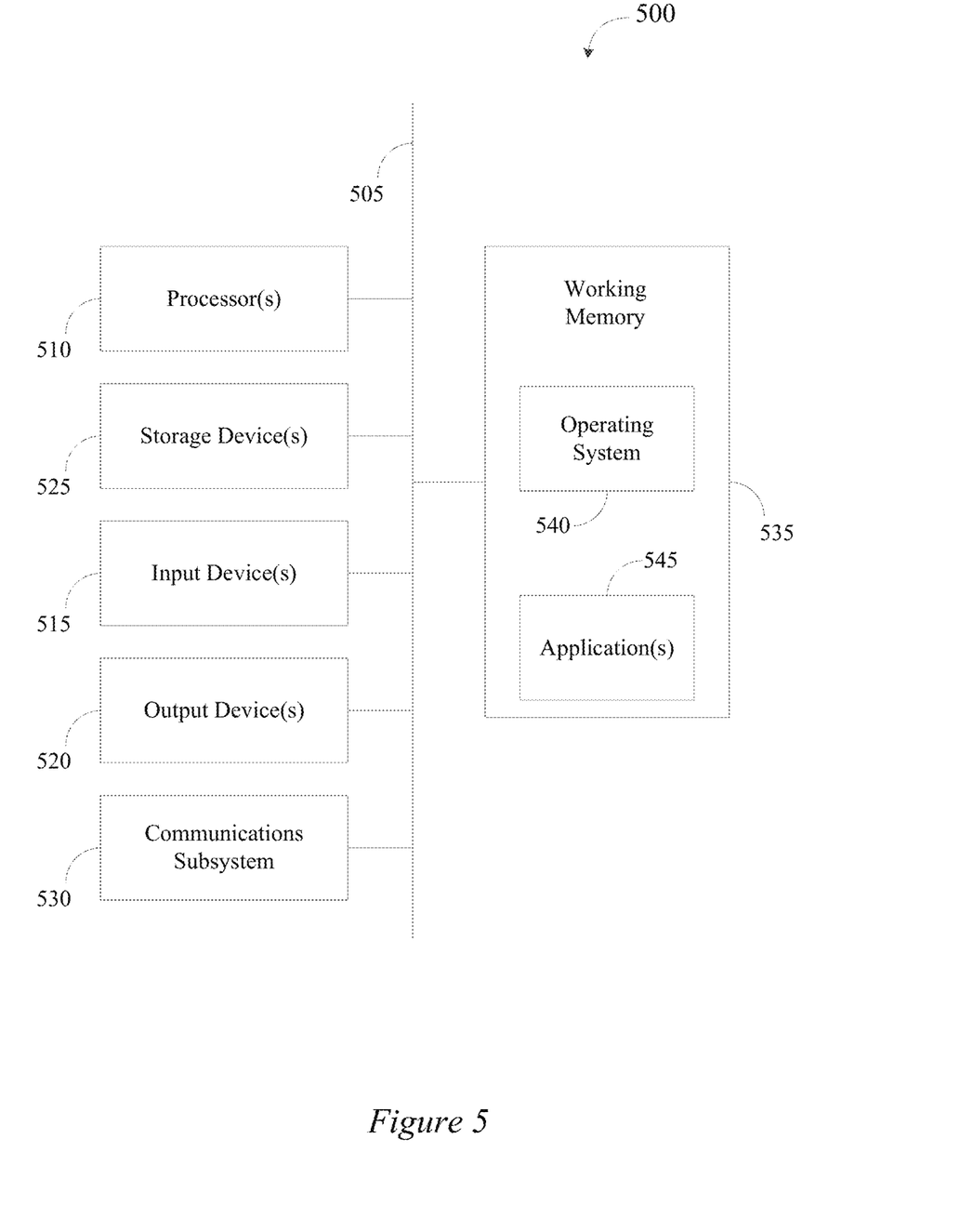
FIG. 5 shows an illustrative computational system for performing functionality to facilitate implementation of embodiments described herein.

The computational system 500, shown in FIG. 5, can be used to perform any of the embodiments of the invention. For example, computational system 500 can be used to execute process 200, 300 and/or 400. As another example, computational system 500 can be used to perform any calculation, identification and/or determination described here. Computational system 500 includes hardware elements that can be electrically coupled via a bus 505 (or may otherwise be in communication, as appropriate). The hardware elements can include one or more processors 510, including, without limitation, one or more general-purpose processors and/or one or more special-purpose processors (such as digital signal processing chips, graphics acceleration chips, and/or the like); one or more input devices 515, which can include, without limitation, a mouse, a keyboard and/or the like; and one or more output devices 520, which can include, without limitation, a display device, a printer and/or the like.

The computational system 500 may further include (and/or be in communication with) one or more storage devices 525, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 500 might also include a communications subsystem 530, which can include, without limitation, a modem, a network card (wireless or wired), an infrared communication device, a wireless communication device and/or chipset (such as a Bluetooth device, an 802.6 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computational system 500 will further include a working memory 535, which can include a RAM or ROM device, as described above.

The computational system 500 also can include software elements, shown as being currently located within the working memory 535, including an operating system 540 and/or other code, such as one or more application programs 545, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 525 described above.

In some cases, the storage medium might be incorporated within the computational system 500 or in communication with the computational system 500. In other embodiments, the storage medium might be separate from a computational system 500 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 500 and/or might take the form of source and/or installable code, which, upon compilation and/or installation on the computational system 500 (e.g., using any of a variety of generally available compilers, installation programs, compression/decompression utilities, etc.) then takes the form of executable code.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar process leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, primarily for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification, discussions utilizing terms such as "processing," "computing," "calculating," "determining," and "identifying," or the like, refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose, microprocessor-based computer systems, accessing stored software that programs or configures the computing system from a general purpose computing apparatus to a specialized computing apparatus, implementing one or more embodiments of the present subject matter. Any suitable programming, scripting, or other type of language or combinations of languages, may be used to implement the teachings contained herein, in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
receiving a video clip having a plurality of frames;
receiving an indication of a planar surface of an object captured within the plurality of frames, wherein the planar surface includes a representation of a specular reflection of light incident on the planar surface from a light source;
identifying a frame of interest from the plurality of frames, the frame of interest including a maximum amount of specular information relative to other frames in the plurality of frames;
fitting an ellipse to the representation of the specular reflection within the frame of interest;
determining an outgoing angle of the light incident on the planar surface within the frame of interest based at least in part on the ellipse; and
determining an incoming angle of the light incident on the planar surface within the frame of interest based at least in part on the outgoing angle of the light incident on the planar surface within the frame of interest and a normal of the planar surface within the frame of interest, wherein the a location of the light source is determined based at least in part on the incoming angle of the light incident on the planar surface within the frame of interest.

2. The method according to claim 1, further comprising:
identifying a second frame of interest within the plurality of frames, wherein the second frame of interest includes a second representation of the specular reflection on the planar surface;
determining a second outgoing angle of the light incident on the planar surface based at least in part on the representation of the specular reflection;
determining a second incoming angle of the light incident on the planar surface based on the second outgoing angle of the light incident on the planar surface and the normal of the planar surface; and
identifying a location of the light source based at least in part on the second incoming angle of the light incident on the planar surface and the incoming angle of the light incident on the planar surface.

3. The method according to claim 1, further comprising:
receiving 3D reconstruction data representing objects within the frame of interest, wherein the 3D reconstruction data includes data representing the planar surface within the frame of interest; and
determining the normal of the planar surface from the 3D reconstruction data.

4. The method according to claim 1, further comprising:
calculating 3D reconstruction data representing objects within the frame of interest, wherein the 3D reconstruction data includes data representing the planar surface within the frame of interest; and determining the normal of the planar surface from the 3D reconstruction data.

5. A method comprising:

receiving a video clip having a plurality of frames;

receiving an indication of a planar surface of an object captured in at least one of the plurality of frames, wherein the planar surface includes a representation of a specular reflection of light incident on the planar surface from a light source;

determining a specular information value for each planar surface in each frame of the plurality of frames;

identifying a maximum specular information frame within the plurality of frames that is associated with a planar surface that has a specular information value greater than the other planar surfaces in the other frames;

fitting an ellipse to the representation of the specular reflection within the maximum specular information frame;

determining an outgoing angle of the light incident on the planar surface based at least in part on the ellipse; and determining an incoming angle of the light incident on the planar surface based at least in part on the outgoing angle of the light incident on the planar surface and a normal of the planar surface.

6. The method according to claim 5, wherein:

the receiving an indication of a planar surface of an object captured in at least one of the plurality of frames further comprises receiving an indication of a first frame within the plurality of frames; and the determining a specular information value for each planar surface in each frame of the plurality of frames, further comprises determining a specular information value for each planar surface in each frame of a second plurality of frames, wherein the second plurality of frames includes the first frame and frames from the plurality of frames either or both before the first frame or after the first frame.

7. The method according to claim 5, wherein the outgoing angle of the light is determined using a center of the ellipse.

8. The method according to claim 5, further comprising performing a subspace analysis for each planar surface within the plurality of frames, wherein the specular information value is determined from the subspace analysis.

9. A system comprising:

a storage device comprising a video clip and 3D reconstruction data, wherein the video clip comprises a plurality of frames, and wherein the 3D reconstruction data comprises data that geometrically represents objects represented within at least a portion of the video clip; and a processor configured to:

receive an indication specifying a planar surface of an object captured within the plurality of frames, wherein the planar surface includes a representation of a specular reflection of light incident on the planar surface from a light source;

identify a frame of interest from the plurality of frames, the frame of interest including a maximum amount of specular information relative to other frames in the plurality of frames;

fit an ellipse to a representation of the specular reflection within the frame of interest;

determine an outgoing angle of the light incident on the planar surface within the frame of interest based at least in part on the ellipse;

determine an incoming angle of the light incident on the planar surface within the frame of interest based on the outgoing angle of light incident on the planar surface, and a normal of the planar surface within the planar surface; and determine a location of a light source based at least in part on the incoming angle.

10. The system according to claim 9, wherein the outgoing angle of the light is determined using a center of the ellipse.

11. The system according to claim 9, wherein the processor is further configured to:

identify a second frame of interest having the planar surface, wherein the second frame of interest includes a second representation of the specular reflection;

determine a second outgoing angle from the second representation of the specular reflection;

determine a second incoming incident angle of light from the normal of the planar surface and the second outgoing angle; and determine the location of a nearby light source based on the second outgoing angle and the normal of the planar surface within the second frame, as indicated by the 3D reconstruction data.

12. The system according to claim 9, wherein the processor is further configured to determine the normal of the planar surface from the 3D reconstruction data.

13. A method comprising:

receiving a video clip having a plurality of frames;

receiving an indication specifying a planar surface of an object captured within at least one of the plurality of frames, wherein the planar surface includes a first representation of a specular reflection of light incident on the planar surface from a light source;

determining a first outgoing angle of the light incident on the planar surface from a first representation of the specular reflection in a first frame of interest, wherein the first frame of interest comprises a frame within the plurality of frames;

determining a second outgoing angle of the light incident on the planar surface from a second representation of the specular reflection in a second frame of interest, wherein the second frame of interest comprises a frame within the plurality of frames; and determining a location of an illumination source from the first outgoing angle and the second outgoing angle.

14. The method according to claim 13, further comprising:

fitting a first ellipse to the first representation of the specular reflection in the first frame of interest, wherein the first outgoing light direction is determined using the fitting of the first ellipse; and fitting a second ellipse to the second representation of the specular reflection in the second frame of interest, wherein the second outgoing light direction is determined using the fitting of the second ellipse.

15. The method according to claim 13, wherein the first frame of interest comprises a frame having a planar region with more specular information than the planar region in the second frame of interest.

16. The method according to claim 13, further comprising:

determining a first incoming incident angle of light from a first normal of the planar surface, within the first frame of interest and the first outgoing angle; and determining a second incoming incident angle of light from a second normal of the planar surface, within the second frame of interest and the second outgoing angle; and determining the location of the illumination source based at least in part on the first incoming angle and the second incoming angle.

17. The method according to claim 16, further comprising receiving 3D reconstruction data for at least a portion of the video clip, wherein the first normal of the planar surface within the first frame of interest, and the second normal of the planar surface within the second frame of interest, are determined from the 3D reconstruction date.

18. A non-transitory computer-readable medium embodying program code executable by a processing device, the non-transitory computer-readable medium comprising program code for, the method comprising:

receiving a video clip having a plurality of frames;

identifying a planar surface of an object captured within the plurality of frames, wherein the planar surface includes a representation of a specular reflection of light incident on the planar surface from a light source;

identifying a frame of interest from the plurality of frames, the frame of interest including a maximum amount of specular information relative to other frames in the plurality of frames;

fitting an ellipse to the representation of the specular reflection within the frame of interest;

determining an outgoing angle of the light incident on the planar surface within the frame of interest based at least in part on the ellipse; and determining an incoming angle of the light incident on the planar surface within the frame of interest based at least in part on the outgoing angle of the light incident on the planar surface within the frame of interest, and a normal of the planar surface within the frame of interest.

* * * * *

UNITED STATES PATENT AND TRADEMARK OFFICE
CERTIFICATE OF CORRECTION

PATENT NO. : 9,076,213 B2
APPLICATION NO. : 13/863739
DATED : July 7, 2015
INVENTOR(S) : Hailin Jin, Hyeongwoo Kim and Sunil Hadap It is certified that error appears in the above-identified patent and that said Letters Patent is hereby corrected as shown below:

On the Title Page:

Beside the paragraph beginning with item "72 Inventors:"

delete "Halin Jin, Campbell, CA (US)"

insert --Hailin Jin, Campbell, CA (US)--

Signed and Sealed this
First Day of December, 2015

Michelle K. Lee
*Director of the United States Patent and Trademark Office*